H. ATKINSON.
GLOBE-VALVE.

No. 177,450.  Patented May 16, 1876.

Witnesses
Thos. H. Watterson
F. A. Moon

Henry Atkinson  Inventor
By
Connolly Bros & McTighe  Attorneys

UNITED STATES PATENT OFFICE.

HENRY ATKINSON, OF PITTSBURG, PENNSYLVANIA, ASSIGNOR OF ONE-HALF HIS RIGHT TO ALONZO P. BACHELOR, OF SAME PLACE.

IMPROVEMENT IN GLOBE-VALVES.

Specification forming part of Letters Patent No. 177,450, dated May 16, 1876; application filed March 31, 1876.

*To all whom it may concern:*

Be it known that I, HENRY ATKINSON, of Pittsburg, in the county of Allegheny and State of Pennsylvania, have invented certain new and useful Improvements in Pistons for Globe-Valves; and I do hereby declare the following to be a full, clear, and exact description of the invention, such as will enable others skilled in the art to which it pertains to make and use it, reference being had to the accompanying drawings, which form part of this specification, in which—

Figure 1:
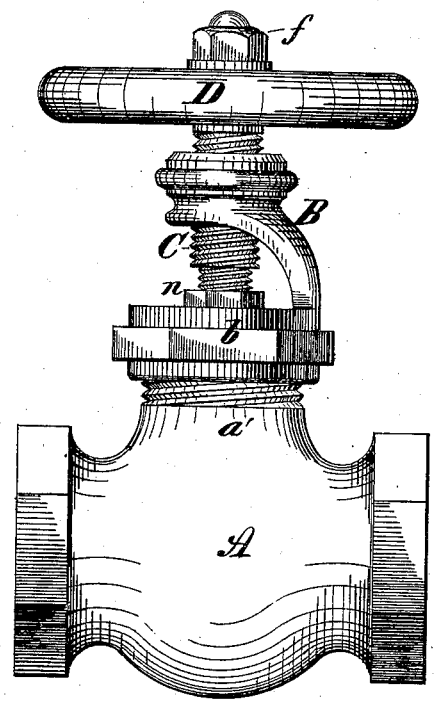
Figure 2:
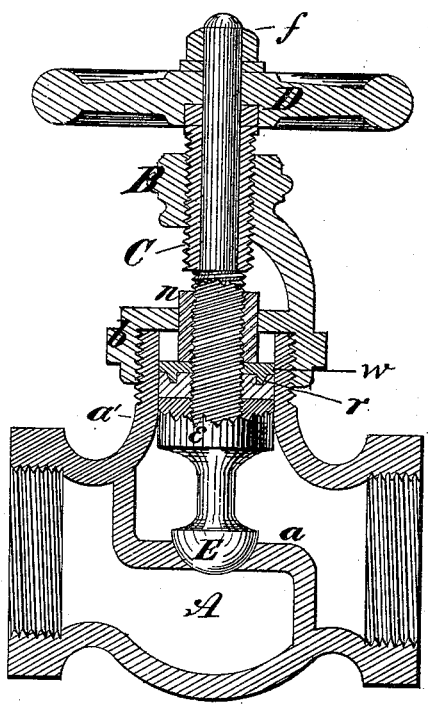
Figure 3:
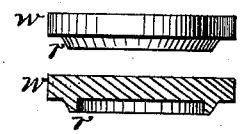

Figure 1 is a side elevation. Fig. 2 is a longitudinal vertical section. Fig. 3 is a detail of washer.

This invention relates to improvements in piston globe-valves; and consists in constructing the stem as a piston, and packing the same, so as to form a steam-tight fitting and an accurate guide to the valve and seat; and in the means adopted for setting out the packing without unseating the valve, or in any way interfering with its functions; and in the construction and combination of devices hereinafter described and claimed.

Referring to the drawings herewith, my invention more particularly is as follows:

The valve-chamber A is of ordinary form, with valve-seat $a$ and shank $a'$. The latter is bored out to a true cylinder, and threaded externally for the cap $b$, which extends upward in a half-arch, B—a novel feature, which I shall soon describe. The arch B is threaded interiorly for the hollow screw C, which is keyed or otherwise rigidly attached to the hand-wheel or lever D. The globe E is of ordinary style, and integral with, or attached to, the stem, which, above the globe, is expanded into a piston, $e$, which is packed above with soft metal, rubber, leather, or any other known packing, so as to make a steam or water tight fit in the shank $a'$ of the valve-chamber. Above the packing is a washer, $w$, of peculiar construction. It has on its under side a V-shaped annular ridge, $r$, or a re-enforcement, with its outer edge inclined, as shown. The object of the ridge or re-enforcement being so inclined is, that when it is forced down the ridge wedges into the packing and spreads it laterally, thereby tightening the joint. The stem is threaded at this portion for a nut, $n$, whose purpose is to operate, as above, on the washer, so as to tighten or loosen the joint. To allow of this at any period of the stroke of piston $e$, the arch B is formed as described, and the nut $n$ is made long enough to slightly project above the cap $b$ more or less, according as the valve is open or closed. This gives an open space, where a wrench can be applied to operate the nut $n$ at any position of the stem. The stem is made smooth at its upper end, fitting nicely in the hollow screw C, passing through it and wheel D, and held by a nut, $f$, above the latter. This formation permits the rotation of the wheel and hollow screw without turning the stem. The latter is consequently raised and lowered by them without turning on its axis, having two accurate bearings for the proper working of the globe, and preventing all grinding effect on the latter or its seat.

The annoyance incident to stuffing-boxes is not present here, because the piston-packing can be tightened or relieved instantly and without taking the valve apart, or in any way interfering with its every-day functions.

This method of adjusting the packing may be applied, with like effect, on other devices where a piston is used, and wear and tear render frequent adjustment necessary.

Having fully described my invention, I claim—

1. The combination of a nut, $n$, or similar device, and a washer, $w$, constructed with an inclined annular ridge, substantially as described, as a means for adjusting the packing, as specified.

2. In combination with valve A, the half-arch B and cap $b$, constructed as shown, to allow adjustment of nut $n$, as set forth.

3. The within-described globe-valve, consisting of chamber A, cap $b$, and arch B, globe E, piston $e$, packing, washer $w$, hollow screw C, and wheel D, all arranged and operating substantially as shown and described.

In testimony that I claim the foregoing I have hereunto set my hand this 22d day of March, 1876.

HENRY ATKINSON.

Witnesses:
SAMUEL ANDERSON,
THOS. J. McTIGHE.